(12) United States Patent
Edwards et al.

(10) Patent No.: US 12,129,018 B2
(45) Date of Patent: Oct. 29, 2024

(54) ACTIVE DRAG CONTROL SYSTEM FOR AN AIRCRAFT

(71) Applicant: Airbus Operations Limited, Bristol (GB)

(72) Inventors: Henry Edwards, Bristol (GB); Keith John Macgregor, Bristol (GB)

(73) Assignee: Airbus Operations Limited, Bristol (GB)

( * ) Notice: Subject to any disclaimer, the term of this patent is extended or adjusted under 35 U.S.C. 154(b) by 275 days.

(21) Appl. No.: 17/740,765

(22) Filed: May 10, 2022

(65) Prior Publication Data

US 2022/0274688 A1    Sep. 1, 2022

Related U.S. Application Data

(63) Continuation of application No. PCT/EP2020/080998, filed on Nov. 4, 2020.

(30) Foreign Application Priority Data

Nov. 11, 2019 (GB) ..................... 1916403

(51) Int. Cl.
*B64C 19/00* (2006.01)
*B64C 13/16* (2006.01)
*B64C 21/06* (2023.01)
*B64U 10/25* (2023.01)
*B64U 101/60* (2023.01)

(52) U.S. Cl.
CPC .............. *B64C 19/00* (2013.01); *B64C 13/16* (2013.01); *B64C 21/06* (2013.01); *B64C 2230/22* (2013.01); *B64U 10/25* (2023.01); *B64U 2101/60* (2023.01)

(58) Field of Classification Search
CPC ......... B64C 13/16; B64C 19/00; B64C 21/00; B64C 21/06; B64C 23/00; B64C 2230/22; F15D 1/008; G05D 1/0202
See application file for complete search history.

(56) References Cited

U.S. PATENT DOCUMENTS

| 4,363,991 | A | 12/1982 | Edelman | |
|---|---|---|---|---|
| 7,104,498 | B2 * | 9/2006 | Englar | .................... B64C 21/04 244/12.6 |

(Continued)

FOREIGN PATENT DOCUMENTS

EP    1 995 173 A1    11/2008

OTHER PUBLICATIONS

International Search Report and Written Opinion for Application PCT/EP2020/080998 dated Jan. 14, 2021.

*Primary Examiner* — Philip J Bonzell
(74) *Attorney, Agent, or Firm* — KDW Firm PLLC

(57) ABSTRACT

An aircraft includes an active drag control system such as a Laminar Flow Control (LFC) system having a port LFC apparatus and a starboard LFC apparatus. The aircraft has a control system to test how efficiently the LFC system is working by differentially operating the port LFC apparatus and the starboard LFC apparatus, for example by deactivating either LFC apparatus, and measuring the effect on the direction of flight of the aircraft. The control system also can change the direction of the aircraft, and trim the aircraft, by differentially operating the port LFC apparatus and the starboard LFC apparatus.

23 Claims, 8 Drawing Sheets

(56) References Cited

U.S. PATENT DOCUMENTS

| | | | |
|---|---|---|---|
| 7,152,829 B2 | 12/2006 | Bertolotti | |
| 8,016,247 B2* | 9/2011 | Schwimley | F15D 1/12 |
| | | | 244/200 |
| 8,074,938 B2* | 12/2011 | Hyde | B64C 21/10 |
| | | | 244/130 |
| 9,002,484 B2* | 4/2015 | Hyde | F15D 1/12 |
| | | | 700/47 |
| 9,541,106 B1 | 1/2017 | Patel et al. | |
| 9,908,617 B2* | 3/2018 | Hassan | B64C 15/14 |
| 10,683,076 B2* | 6/2020 | Zha | B64C 3/36 |
| 10,683,077 B2* | 6/2020 | Zha | F15D 1/0055 |
| 11,034,430 B2* | 6/2021 | Zha | B64C 3/141 |
| 11,485,472 B2* | 11/2022 | Zha | F15D 1/0055 |
| 2005/0029396 A1* | 2/2005 | Englar | B64C 21/04 |
| | | | 244/12.6 |
| 2008/0128560 A1* | 6/2008 | Hyde | B64C 23/005 |
| | | | 244/203 |
| 2008/0128561 A1* | 6/2008 | Hyde | B64C 23/005 |
| | | | 244/204 |
| 2010/0133386 A1* | 6/2010 | Schwimley | B64C 23/005 |
| | | | 315/111.21 |
| 2011/0272531 A1 | 11/2011 | Minick et al. | |
| 2011/0309201 A1* | 12/2011 | Hassan | B64C 15/14 |
| | | | 244/207 |
| 2019/0127042 A1* | 5/2019 | Zha | B64C 21/025 |
| 2019/0161158 A1* | 5/2019 | Zha | B64C 3/36 |
| 2019/0185136 A1* | 6/2019 | Zha | B64C 3/36 |
| 2021/0284319 A1* | 9/2021 | Zha | F15D 1/0055 |
| 2023/0056996 A1* | 2/2023 | Zha | B64C 3/36 |

* cited by examiner

ACTIVE DRAG CONTROL SYSTEM FOR AN AIRCRAFT

CROSS-REFERENCE TO RELATED APPLICATIONS

This application is a continuation of and claims priority to PCT/EP2020/080998 filed Nov. 4, 2020, which claims priority to GB Patent Application No. 1916403.7 filed Nov. 11, 2019, the entire disclosures of which are incorporated by reference herein.

TECHNICAL FIELD

The disclosure herein concerns an active drag control system for an aircraft. More particularly, but not exclusively, this disclosure concerns a Laminar Flow Control (LFC) system for an aircraft. The disclosure herein also concerns an aircraft incorporating an LFC system, a control system for an LFC system, and methods of testing an LFC system, changing direction of an aircraft using an LFC system, and trimming an aircraft using an LFC system.

BACKGROUND

Active drag control systems are aircraft systems which can be used to control the drag caused by an aircraft structure. The systems are active in the sense that they are selectively operable, for example they may be turned on or off, and/or their influence over the drag may be altered/varied in some way during flight. A Laminar Flow Control (LFC) system is an example of an active drag control system.

LFC systems are used to delay the transition of a boundary layer of airflow over a skin of an aircraft from laminar to turbulent flow. By applying suction through the aircraft skin, it is possible to stabilize the laminar boundary layer and so delay its transition to turbulent flow. Delaying the transition of the boundary layer to turbulent flow reduces the length of skin of the aircraft in contact with the turbulent boundary layer, yielding a reduction in drag and an associated increase in fuel efficiency and/or aircraft range.

An advancement made in the development of LFC technology is the concept of Hybrid Laminar Flow Control (HLFC). Typically in HLFC systems suction is required only in the leading-edge region of the wing, typically ahead of the front spar. Attempts are made to maintain Natural Laminar Flow (NLF) over the remainder of the wing by tailoring the geometry of the wing.

Other examples of active drag control systems include dynamic wave suppression systems, actively deformable materials, vortex generators, and temperature control systems configured to change the temperature of air flowing over the aircraft.

U.S. Pat. No. 7,152,829 relates to an LFC system that provides boundary layer control by suction through a perforated surface of an airfoil.

The performance benefits (e.g. reduced drag and therefore improved fuel efficiency) associated with the use of an active drag control system, such as an LFC system, may become significant to aircraft operators over the course of a long range flight. However, such performance benefits may be difficult to measure at any given instant during a flight. Accordingly, it may be difficult during flight to determine, in real time, whether an LFC system is operating at full efficiency, or whether maintenance and/or cleaning is required (e.g. due to the perforations in the skin panels becoming clogged by contaminants such as dirt, dust, bug splats, etc).

The disclosure herein seeks to mitigate one or more of the above-mentioned problems. Alternatively or additionally, the disclosure herein seeks to provide a method of determining the operational performance of an LFC system.

SUMMARY

The disclosure herein provides, according to a first aspect, a laminar flow control (LFC) system for an aircraft, the LFC system comprising: a first LFC apparatus for use in a port aircraft structure, wherein the first LFC apparatus is operable to promote laminar flow of air over the port aircraft structure and thereby cause a reduction in drag on a port side of the aircraft; a second LFC apparatus for use in a starboard aircraft structure, wherein the second LFC apparatus is operable to promote laminar flow of air over the starboard aircraft structure and thereby cause a reduction in drag on a starboard side of the aircraft; and a control system configured to perform a test of the LFC system while the aircraft is flying a first direction by: differentially operating the first LFC apparatus and the second LFC apparatus so as to change the amount of drag on the port side of the aircraft caused by the port aircraft structure relative to the amount of drag on the starboard side of the aircraft caused by the starboard aircraft structure; measuring the effect of differentially operating the first LFC apparatus and the second LFC apparatus on the direction of flight of the aircraft; and determining, on the basis of the measurement, how efficiently the first LFC apparatus and/or the second LFC apparatus are operating.

Changing the amount of drag on the port side of the aircraft in comparison with the amount of drag on the starboard side of the aircraft may cause the drag forces to become unbalanced about a centreline of the aircraft. The unbalanced forces may result in a net moment of force (i.e. a net rotational force) about an axis (e.g. the yaw axis) of the aircraft. The first aspect of the disclosure herein proposes to measure the effect the imbalance in drag has on the direction of flight of the aircraft in order to determine how efficiently the first LFC apparatus, or second LFC apparatus, as the case may be, is operating.

The control system may be configured to measure the effect of differentially operating the first LFC apparatus and the second LFC apparatus by measuring a rate of change of the direction of the aircraft. The change of the direction may be due to a rotation of the aircraft about the yaw axis. The change of the direction may be a change in the heading. The change in direction may be an amount of deviation from a straight flightpath, e.g. an angular deviation or a distance deviation. The direction of the aircraft may be determined by an on-board system, for example a heading indicator (e.g. a compass, a directional gyro, etc.), and/or a satellite navigation system (e.g. a GPS navigation system). Said on-board system may interface with, or be a part of, the control system. Preferably, while the rate of change of direction is measured, the control surfaces of the aircraft are not moved.

The control system may be configured to instruct a corrective action in order to counteract the forces causing the change in the direction of the aircraft. The control system may be configured to measure the effect of differentially operating the first LFC apparatus and the second LFC apparatus by measuring an amount of corrective action required restore the direction of flight to the first direction. The control system may be configured to measure the effect of differentially operating the first LFC apparatus and the second LFC apparatus by measuring an amount of corrective action required to maintain the direction of flight in the first direction.

The corrective action may be changing the position of a control surface of the aircraft. Measuring the amount of corrective action may comprise measuring an amount of movement of the control surface. The control surface may be a rudder.

The corrective action may be changing the thrust produced by an engine of the aircraft. Measuring the amount of corrective action may comprise measuring a change in thrust provided by the engine. The thrust provided by the engine may be proportional to a position of the throttle of the engine, a rate of fuel flow to the engine, and/or a rotational speed of the engine (e.g. the engine RPM). Measuring an amount of corrective action may comprise measuring a change in the position of the throttle, a change in the rate of fuel flow to the engine, and/or a change in the rotational speed of the engine.

Each aircraft structure comprising an LFC apparatus may comprise an outer surface having a perforated section. The outer surface may be provided by a skin of the aircraft structure. Each LFC apparatus may comprise a pump arranged to suck air through the perforations of the perforated section. The pump may be a compressor. Each LFC apparatus may comprise a duct arranged to transport air away from the perforations.

Each aircraft structure may be a wing, a tailplane, or an engine nacelle. Accordingly, the port aircraft structure may be a port wing, a port section of an aircraft tailplane, or a port engine nacelle. The starboard aircraft structure may be a starboard wing, a starboard section of an aircraft tailplane, or a starboard engine nacelle. Preferably, the port aircraft structure and the starboard aircraft structure are corresponding structures, that is to say, they are the same type of structure, preferably in the same position, but on opposite sides of the aircraft.

The LFC system may be a Hybrid Laminar Flow Control (HLFC) system. Each LFC apparatus may be a HLFC apparatus. Accordingly, the perforated section may be provided in a leading edge region of the aircraft structure. The perforated section may be provided forward of a front spar of a wing. The perforated section may only be provided in a leading edge region of the aircraft structure and/or forward of a front spar of a wing. The aircraft may comprise a mixture of LFC and HLFC apparatus.

The control system may be configured to differentially operate the first LFC apparatus and the second LFC apparatus by changing a rate of airflow in the first LFC apparatus relative to the rate of airflow in the second LFC apparatus. The rate of airflow may be the rate of airflow through the perforations in the perforated section. The rate of airflow in an LFC apparatus may be changed by altering the power supplied to the pump of the LFC apparatus.

Changing the rate of airflow in the first LFC apparatus relative to the rate of airflow in the second LFC apparatus may comprise changing the rate of airflow in one or both of the first LFC apparatus and the second LFC apparatus. By changing the airflow through only one of the LFC apparatus, it may be more straightforward to determine the impact of the change on the motion of the aircraft.

The control system may be configured to differentially operate the first LFC apparatus and the second LFC apparatus by deactivating (e.g. turning off) either the first LFC apparatus or the second LFC apparatus. An LFC apparatus may be deactivated by deactivating the pump of the LFC apparatus. By completely deactivating one of the LFC apparatus, it may be more straightforward to determine the total effect the deactivated LFC apparatus was having on the drag of the aircraft. Additionally, the effect of completely deactivating an LFC system is likely to be more noticeable than if, for example, the LFC apparatus was changed by decreasing the power to the LFC system but not deactivating it completely.

By way of example, if, following deactivation of the first LFC apparatus, the aircraft changed direction to port at a relatively high rate, it may indicate that the first LFC apparatus was having a significant contribution to the reduction in drag on the port side of the aircraft and thus working at close to full efficiency. If, following deactivation of the first LFC apparatus, the aircraft changed direction to port at a relatively low rate, it may indicate that the first LFC apparatus was having a minor contribution to the reduction in drag on the port side of the aircraft and thus working at a reduced efficiency. If, following deactivation of the first LFC apparatus, the aircraft did not undergo a change in direction, it may indicate that the first LFC apparatus was working at a very low efficiency or was not working at all.

An efficiency value for the first LFC apparatus and/or the second LFC apparatus may be determined on the basis of the measurement. The control system may comprise a stored function (e.g. a formula) relating the measurement to an efficiency of the LFC apparatus. The function may take into account other variables such as flight speed and/or altitude, as these may also impact drag. The control system may comprise a lookup table relating the measurement to an efficiency of the LFC apparatus. The function and/or lookup table entries may be determined empirically during testing of the aircraft or aircraft type. Determining how efficiently the first LFC apparatus and/or the second LFC apparatus are operating may comprise utilizing the function and/or lookup table to obtain an efficiency value.

Determining how efficiently the first LFC apparatus and/or the second LFC apparatus are operating may comprise comparing the measurement with reference data defining the effect of differentially operating the first LFC apparatus and the second LFC apparatus at a known efficiency (e.g. at full efficiency, for example as determined when the LFC system and/or the aircraft is new and clean).

In alternative embodiments, the control system may provide a qualitative indication of how efficiently the first LFC apparatus and/or the second LFC apparatus are operating. For example, a low, medium or high indication of efficiency may be provided.

Unless a particular element (e.g. the pump) of an LFC apparatus malfunctions, it is thought that one of the primary reasons for the efficiency of an LFC apparatus reducing during normal usage is due to clogging of the perforations associated with the LFC apparatus. The perforations in corresponding aircraft structures at corresponding positions on opposite sides of the aircraft may tend to clog at an approximately equal rate. Therefore, it may only be necessary to test (i.e. turn off/change the airflow through) a part of the LFC system (e.g. only one of the LFC apparatuses) during the test. The efficiency of the corresponding part of the LFC system on the other side of the aircraft, and optionally the LFC system as a whole, may be inferred from the result of the test. For example, the first LFC apparatus may be tested, and it may be assumed that the second LFC apparatus is operating to approximately the same efficiency. The LFC apparatus under test may be the LFC apparatus that has been deactivated or undergone a commanded change in the rate of airflow therethrough.

In alternative embodiments, the control system is configured to test both the first LFC apparatus and the second LFC apparatus in turn, for example by turning off/changing the airflow through each LFC apparatus in turn while measuring the effect on the direction of flight.

The aircraft may comprise a plurality of independently operable first LFC apparatuses on the port side of the aircraft, and a corresponding plurality of independently operable second LFC apparatuses on the starboard side of the aircraft. Each aircraft structure may comprise a plurality of independently operable LFC apparatuses. For example, each wing may comprise a plurality of independently operable LFC apparatuses corresponding to different perforated sections along the span of the wing. The aircraft may comprise multiple different types of structure comprising an LFC apparatus.

Each first LFC apparatus and its corresponding second LFC apparatus may define a pair of corresponding LFC apparatuses. The control system may be configured to differentially operate each pair of LFC apparatuses in turn to determine how efficiently each first LFC apparatus and/or each second LFC apparatus are operating.

The control system may be configured to initiate the test autonomously. The control system may be configured to initiate the test at predetermined times during flight. For example, the control system may be configured to initiate the test at regular time intervals. The control system may be configured to initiate the test during particular phases of flight, for example during cruise. Additionally or alternatively, the control system may be configured to initiate the test in response to input from an operator (e.g. a pilot). The control system may be configured to provide the results of the test to the operator.

The control system may be configured to perform the test of the LFC system while the aircraft is in trim. The control system may be configured to perform the test of the LFC system during level flight. The control system may be configured to initiate the test of the LFC system while the direction of flight is constant. The control system may be configured to perform the test of the LFC system while the control surfaces of the aircraft are set so as to achieve a constant direction of flight. The control surfaces may only be moved during the test if done so as a corrective action. The control system may be configured to perform the test of the LFC system during a change of direction of the aircraft, as will be discussed below.

The control system may be configured to determine a range of the aircraft in dependence on the efficiency of operation of the LFC system so determined.

The disclosure herein provides, according to a second aspect of the disclosure herein A laminar flow control (LFC) system for an aircraft, the LFC system comprising: a first LFC apparatus for use in a port aircraft structure, wherein the first LFC apparatus is operable to promote laminar flow of air over the port aircraft structure and thereby cause a reduction in drag on a port side of the aircraft; a second LFC apparatus for use in a starboard aircraft structure, wherein the second LFC apparatus is operable to promote laminar flow of air over the starboard aircraft structure and thereby cause a reduction in drag on a starboard side of the aircraft; and a control system configured to control (e.g. change) the direction (e.g. heading) of the aircraft during flight by differentially operating the first LFC apparatus and the second LFC apparatus so as to change the amount of drag on the port side of the aircraft caused by the port aircraft structure relative to the amount of drag on the starboard side of the aircraft caused by the starboard aircraft structure.

Changing the amount of drag on the port side of the aircraft in comparison with the amount of drag on the starboard side of the aircraft may cause the drag forces to become unbalanced about a centreline of the aircraft. The unbalanced forces may result in a net moment of force (i.e. a net rotational force) about an axis (e.g. the yaw axis) of the aircraft. The second aspect of the disclosure herein proposes to utilize the control over the drag on each side of the aircraft in order to control the direction of flight of the aircraft.

In order to change the direction of the aircraft to port, the LFC system may be operated so as to reduce the amount of drag reduction provided by the first LFC apparatus (e.g. by reducing the rate of airflow in the first LFC apparatus or deactivating the first LFC apparatus), which increases the drag force on the port side of the aircraft. In order to change the direction of the aircraft to starboard, the LFC system may be operated so as to reduce the amount of drag reduction provided by the second LFC apparatus (e.g. by reducing the rate of airflow in the second LFC apparatus or deactivating the second LFC apparatus), which increases the drag force on the starboard side of the aircraft.

The control system may be configured to change the direction of the aircraft without movement of a rudder and/or without movement of an aileron of the aircraft. The control system may be configured to change the direction of the aircraft without movement of any of the control surfaces of the aircraft. In alternative embodiments, the differential operation of the first LFC apparatus and the second LFC apparatus may assist the turning forces provided by movement of control surfaces during a change of direction.

The control system may be configured to, when the desired direction of the aircraft has been reached, cease the differential operation of the first LFC apparatus and the second LFC apparatus. When the desired direction of the aircraft has been reached, the first LFC apparatus and the second LFC apparatus may be operated such that they maximize the amount of drag reduction for their respective aircraft structure (i.e. the drag of the aircraft structures are minimized within the capabilities of the LFC system).

The control system may be configured to initiate a change of direction in response to commands from an autopilot system of the aircraft. The control system may be configured to receive an input (e.g. from an autopilot system or a human operator) of a desired direction of the aircraft, and in response to the input cause a change of direction of the aircraft at least in part by differentially operating the first LFC apparatus and the second LFC apparatus.

It may be possible to perform a test of the LFC system during a change of direction of the aircraft by measuring the rate at which the direction of the aircraft changes, and using the rate measurements to determine how efficiently elements of the LFC system are operating. Accordingly, the control system may be further configured to perform a test the LFC system during a change of direction. The control system may be configured to determine, on the basis of the measurement, how efficiently the port LFC apparatus and/or the starboard LFC apparatus are operating. Preferably the test is performed during a change of direction that does not involve movement of control surfaces.

The disclosure herein may provide, according to a third aspect, a laminar flow control (LFC) system for an aircraft, the LFC system comprising: a first LFC apparatus for use in a port aircraft structure, wherein the first LFC apparatus is operable to promote laminar flow of air over the port aircraft structure and thereby cause a reduction in drag on a port side of the aircraft; a second LFC apparatus for use in a starboard aircraft structure, wherein the second LFC apparatus is operable to promote laminar flow of air over the starboard aircraft structure and thereby cause a reduction in drag on a starboard side of the aircraft; and a control system configured to trim the aircraft during flight by differentially operating the first LFC apparatus and the second LFC apparatus so as to change the amount of drag on the port side of the aircraft caused by the port aircraft structure relative to the amount of drag on the starboard side of the aircraft caused by the starboard aircraft structure, preferably such that the aircraft becomes trimmed about the yaw axis.

The third aspect of the disclosure herein proposes utilizing the ability to change the drag forces on each side of the aircraft to trim the aircraft.

The control system may be configured to receive an input (e.g. from an autopilot system or a human operator) indicating that the aircraft is out of trim, or at least out of trim about the yaw axis. The aircraft may be out of trim if it is determined that the aircraft has a tendency to turn such that straight and/or level flight cannot be maintained without adjusting a flight control surface (e.g. the rudder). The control system may be configured, in response to said input, to trim the aircraft at least in part by differentially operating the first LFC apparatus and the second LFC apparatus.

The third aspect of the disclosure herein may be particularly applicable to aircraft that comprise a plurality of independently operable first LFC apparatuses on the port side of the aircraft, and a corresponding plurality of independently operable second LFC apparatuses on the starboard side of the aircraft. The control system may be configured to differentially operate only a selection of the LFC apparatuses in order to achieve trim.

The turning effect that results from altering the amount of drag reduction provided by an LFC apparatus may depend on the distance of the associated perforated section from the axis of rotation of the aircraft (in particular the yaw axis). The drag at the distal end (outboard end) of a wing may have the greatest moment arm. The control system may be configured to trim the aircraft by differentially operating a first LFC apparatus associated with perforations located at a distal end of the port wing (and which is therefore configured to reduce drag caused by the distal end of the port wing), and a corresponding second LFC apparatus associated with perforations located at a distal end of the starboard wing (and which is therefore configured to reduce drag caused by the distal end of the starboard wing). The port and starboard wings may each comprise one or more additional LFC apparatus, positioned further inboard, which are not differentially operated during trimming.

The actions taken by the control system to control the flight of the aircraft (e.g. to change the direction of the aircraft and/or to trim the aircraft) may be taken automatically. For example, commencing and/or terminating the differential operation of the first LFC apparatus and second LFC apparatus may be performed automatically.

The control system may be configured to perform a test of the LFC system, control the direction of flight of the aircraft using the LFC system and/or trim the aircraft using the LFC system.

The disclosure herein provides, according to a fourth aspect, an aircraft comprising an LFC system according to any of the preceding aspects of the disclosure herein.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

The aircraft may be an Unmanned Aerial Vehicle. The disclosure herein may be useful in UAVs as it may provide a way to effect a change in direction of the UAV during flight without recourse to the movement of control surfaces. It may therefore be possible to reduce the size, number, or usage of the movable control surfaces. It may be useful to reduce the size, number, or usage of movable control surfaces in order to reduce the visibility of the UAV on radar. The disclosure herein may also be useful in the case of UAVs as they may be required to stay in the air for long periods and may require only gradual charges of direction.

The disclosure herein provides, according to a fifth aspect, a control system for an LFC system according to any of the preceding aspects of the disclosure herein.

The disclosure herein provides, according to a sixth aspect, a method of testing a laminar flow control (LFC) system of an aircraft, wherein the aircraft comprises: a port aircraft structure comprising a first LFC apparatus operable so as to promote laminar flow of air over the port aircraft structure and thereby cause a reduction in drag on a port side of the aircraft; and a starboard aircraft structure comprising a second LFC apparatus operable so as to promote laminar flow of air over the starboard aircraft structure and thereby cause a reduction in drag on a starboard side of the aircraft; and wherein the method comprises the steps of: flying the aircraft in a first direction; differentially operating the first LFC apparatus and the second LFC apparatus so as to change the amount of drag on the port side of the aircraft caused by the port aircraft structure relative to the amount of drag on the starboard side of the aircraft caused by the starboard aircraft structure; measuring the effect of differentially operating the first LFC apparatus and the second LFC apparatus on the direction of flight of the aircraft; and determining, on the basis of the measurement, how efficiently the first LFC apparatus and/or the second LFC apparatus are operating. The method may be performed during a change of direction of the aircraft.

The disclosure herein provides, according to a seventh aspect, a method of controlling the direction of an aircraft in flight, the aircraft comprising: a port aircraft structure comprising a first LFC apparatus operable so as to promote laminar flow of air over the port aircraft structure and thereby cause a reduction in drag on a port side of the aircraft; and a starboard aircraft structure comprising a second LFC apparatus operable so as to promote laminar flow of air over the starboard aircraft structure and thereby cause a reduction in drag on a starboard side of the aircraft; wherein the method comprises the steps of: flying the aircraft in a first direction; and differentially operating the first LFC apparatus and the second LFC apparatus so as to change the amount of drag on the port side of the aircraft caused by the port aircraft structure relative to the amount of drag on the starboard side of the aircraft caused by the starboard aircraft structure (e.g. such that the aircraft rotates about the yaw axis and the direction of flight changes).

The disclosure herein provides, according to an eighth aspect, a method of trimming an aircraft in flight, the aircraft comprising: a port aircraft structure comprising a first LFC apparatus operable so as to promote laminar flow of air over the port aircraft structure and thereby cause a reduction in drag on a port side of the aircraft; and a starboard aircraft structure comprising a second LFC apparatus operable so as to promote laminar flow of air over the starboard aircraft structure and thereby cause a reduction in drag on a starboard side of the aircraft; wherein the method comprises the steps of: flying the aircraft in a first direction, wherein the aircraft is out of trim such that there is rotation about the yaw axis; and differentially operating the first LFC apparatus and the second LFC apparatus so as to change the amount of drag on the port side of the aircraft caused by the port aircraft structure compared to the amount of drag on the starboard side of the aircraft caused by the starboard aircraft structure such that the aircraft becomes trimmed about the yaw axis.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa. In particular, the methods of the disclosure herein may comprise any steps in which it is herein described the LFC system, or components thereof, may carry out (i.e. are configured/arranged to carry out).

It is envisioned that the disclosure herein may be also applicable to other active drag control systems that are operable to reduce drag cause by an aircraft structure. In the present disclosure, and where applicable, references to an LFC system/apparatus may be replaced by references to an active drag control system/apparatus. In particular, it will be understood that by differentially operating such systems, so as to change the drag reduction provided by the system on one side of the aircraft relative to the other, the efficiency of the system may be determined, the direction of the aircraft may be controlled, and/or the aircraft may be trimmed.

The term 'or' shall be interpreted as 'and/or' unless the context requires otherwise.

BRIEF DESCRIPTION OF THE DRAWINGS

Embodiments of the disclosure herein will now be described by way of example only with reference to the accompanying schematic drawings of which.

DETAILED DESCRIPTION

Figure 1:
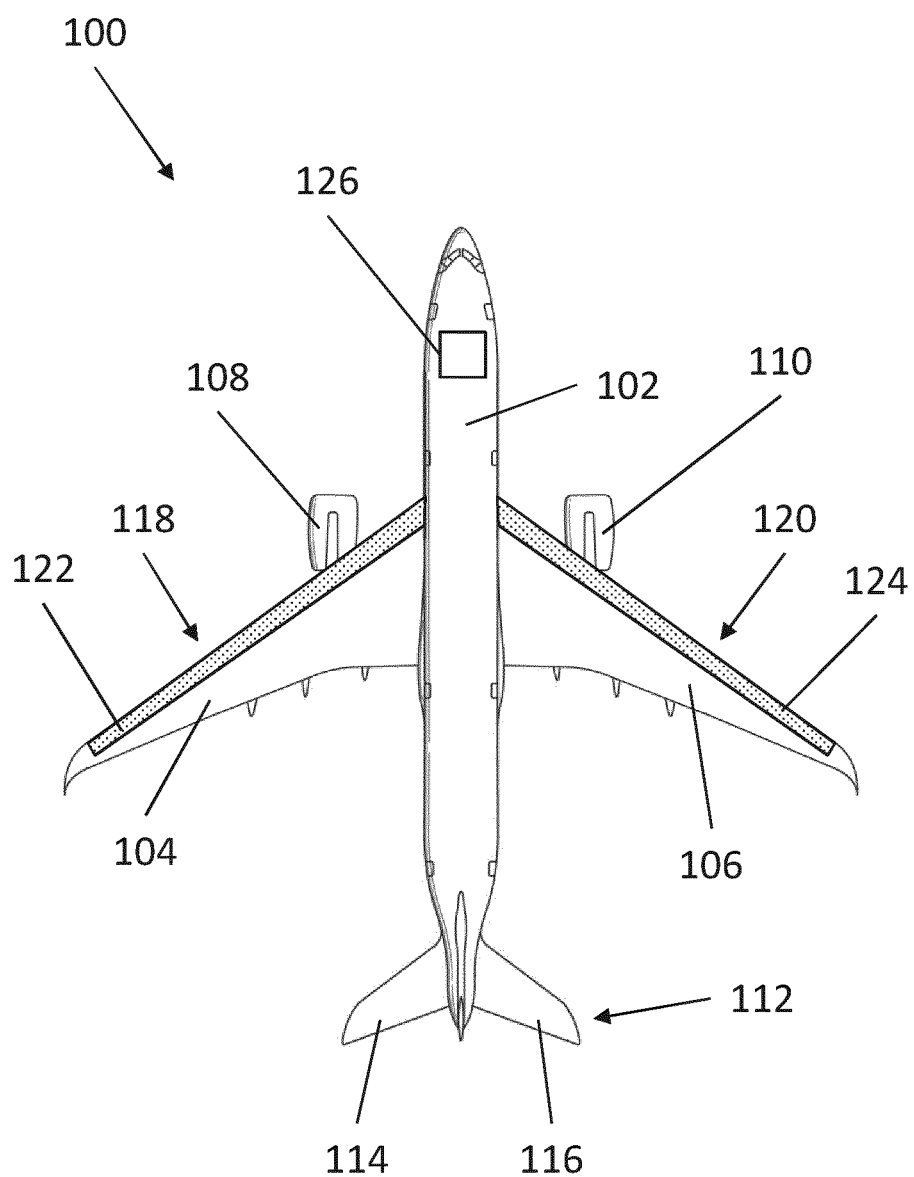
FIG. 1 shows a plan view of an aircraft according to a first embodiment of the disclosure herein.

FIG. 1 shows an aircraft 100 comprising a central fuselage 102. A port wing 104 is mounted to a port side of the fuselage 102, and a starboard wing 106 is mounted to the starboard side of the fuselage 102. A port engine 108 is mounted to the port wing 104, and a starboard engine 110 is mounted to the starboard wing 106. A tailplane 112 (also known as a horizontal stabilizer) is mounted to an aft section of the fuselage 102. The tailplane has a port section 114 to port of the fuselage 102, and a starboard section 116 to starboard of the fuselage 102.

The aircraft 100 comprises a Laminar Flow Control (LFC) system according to the first embodiment of the disclosure herein. The LFC system comprises a first (port) HLFC apparatus 118 associated with the port wing 104, and a second (starboard) HLFC apparatus 120 associated with the starboard wing 106.

Figure 2:
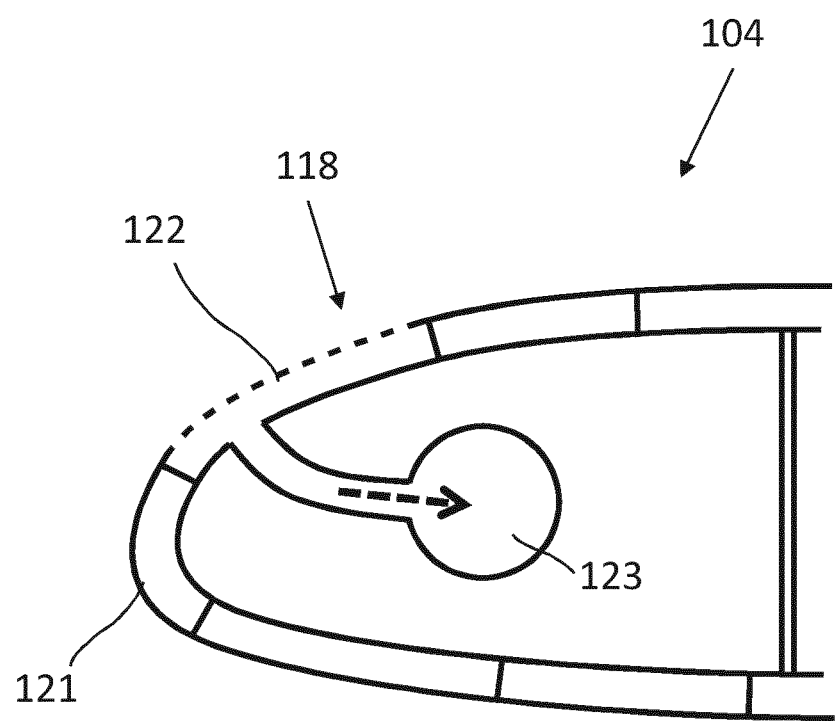
FIG. 2 shows a cross-sectional side view of a portion of a wing of the aircraft according to the first embodiment of the disclosure herein.

The port wing 104 comprises a wing skin 121 comprising a perforated section 122 located at a leading edge of the port wing 104. The first HLFC apparatus 118 comprises a pump (not shown) arranged to generate suction and pull air through the perforated section 122 and into a conduit 123 in the port wing 104. This arrangement is shown schematically in FIG. 2. The first HLFC apparatus 118 is arranged such that air passes through the conduit 123 and is exhausted to the outside airflow.

Similarly, the starboard wing 106 comprises a wing skin comprising a perforated section 124 located at a leading edge of the starboard wing 106. The second HLFC apparatus 120 comprises a pump arranged to generate suction and pull air through the perforated section 124 and into a conduit in the starboard wing 106. The arrangement is similar to that shown in FIG. 2. The second HLFC apparatus 120 is arranged such that air passes through the conduit and is exhausted to the outside airflow.

The LFC system further comprises a control system 126 configured to control the first HLFC apparatus 118 and the second HLFC apparatus 120 independently of each other. In particular, the control system 126 is able to independently control the power going to the pump of the first HLFC apparatus 118 and the pump of the second HLFC apparatus 120. The control system 126 is thereby able to independently change the rate of airflow through each of the first HLFC apparatus 118 and the second HLFC apparatus 120, and also independently activate and deactivate each of the first HLFC apparatus 118 and the second HLFC apparatus 120.

During flight, with the LFC system not in use (i.e. with the pumps deactivated), air flows over the wing skin and, at some point, the boundary layer of air (i.e. the layer of air adjacent the wing skin) transitions from laminar to turbulent flow. When the LFC system is used during flight, the suction through the perforated sections 122, 124 delays the transition of the boundary layer from turbulent to laminar flow. Delaying the transition of the boundary layer from turbulent to laminar flow has the effect of reducing the drag caused by the wings 104, 106.

The ability of the control system 126 to independently control each HLFC apparatus means that the first HLFC system 118 and the second HLFC system 120 can be differentially operated. The differential operation may involve the rate of airflow in the first HLFC apparatus 118 being changed relative to the rate of airflow in the second HLFC apparatus 120. Similarly, the differential operation may involve one of the HLFC apparatus being active (e.g. switched on), while the other HLFC apparatus is not active (e.g. switched off).

By reducing the rate of airflow in an HLFC apparatus, or by deactivating the HLFC apparatus, the amount of drag reduction provided by the HLFC apparatus reduces. Accordingly, the drag caused by the associated aircraft structure (in this case the wing) increases. If the HLFC apparatus 118, 120 are differentially operated, then the drag forces on the wings 104, 106 may become imbalanced. In other words, there may be an asymmetry in the drag about the fuselage 102. The imbalance (asymmetry) may result in a net turning force acting on the aircraft 100.

Figure 3:
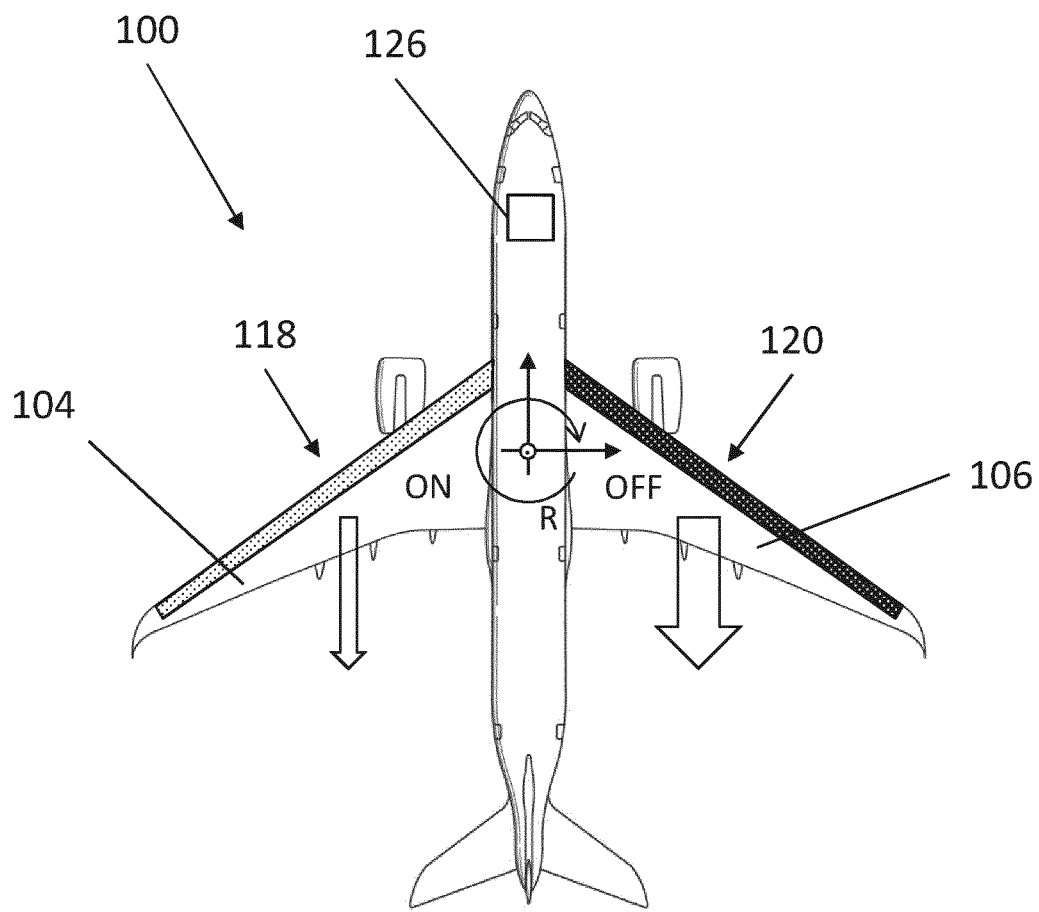
FIG. 3 shows a plan view of the aircraft according to the first embodiment of the disclosure herein, with the HLFC apparatus for the starboard wing deactivated.

FIG. 3 shows an example in which the second HLFC apparatus 120 is deactivated, while the first HLFC apparatus 118 is operated at full power. As indicated by the size of the arrows, the drag forces caused by the starboard wing 106 are higher than the drag forces caused by the port wing 104. The imbalance in forces about the fuselage 102 result in a turning moment (R) about the yaw axis (the yaw axis extending out of the page). If the turning forces are not countered by movement of a control surface, such as a rudder, the aircraft will begin to change direction to starboard.

The disclosure herein seeks to take advantage of this effect in the following ways: (i) to determine how efficiently the LFC system, or aspects thereof, are operating, (ii) to change the direction of the aircraft, and (iii) to trim the aircraft.

Accordingly, the control system 126 is configured to perform a test of the LFC system during flight. The test is performed by the control system 126 differentially operating the first HLFC apparatus 118 and the second HLFC apparatus 120, measuring the effect of the differentially operation on the direction of flight of the aircraft, and determining, on the basis of the measurement, how efficiently the first HLFC apparatus 118 and/or the second HLFC apparatus 120 was operating.

Figure 4:
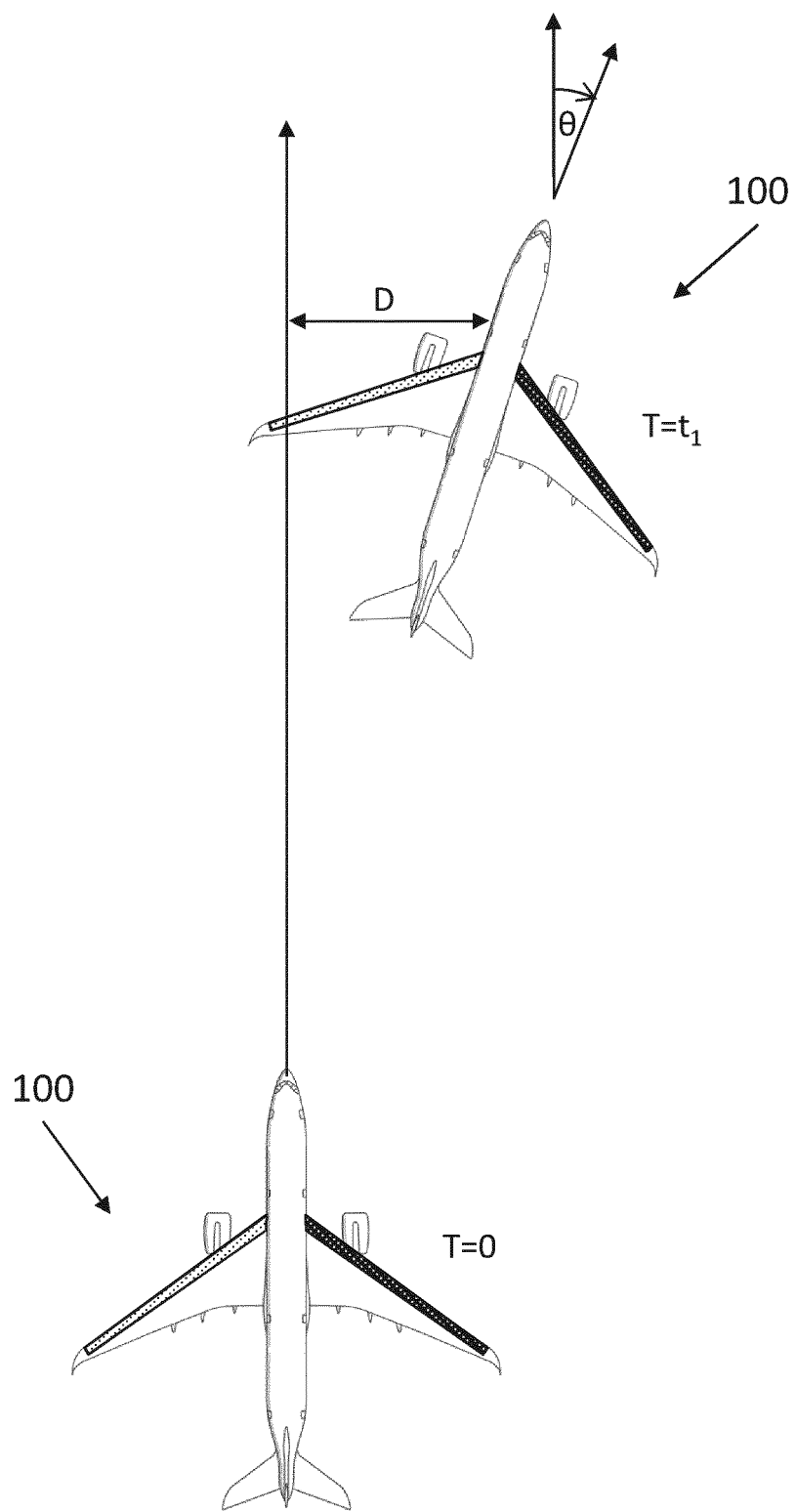
FIG. 4 shows a plan view of the aircraft according to the first embodiment of the disclosure herein, demonstrating a first method of testing the LFC system.

A first method of testing the LFC system will now be described with reference to FIG. 4. In an initial step, the control system 126 determines whether the flight conditions are suitable for the test to be initiated. The control system 126 thereby verifies that the aircraft 100 is flying at a constant heading, at a constant altitude, and is in trim. If these criteria are met, the control system 126 is configured to proceed with the test.

The control system 126 then differentially operates the first HLFC apparatus 118 and the second HLFC apparatus 120 by leaving the first HLFC apparatus 118 active and operating at a power which maximizes the amount of drag reduction (minimizes drag), and deactivating the second HLFC apparatus 120. The aircraft 100 is then allowed to fly for a predetermined period of time (ti) without movement of any control surfaces or change in engine power. The predetermined period of time may vary with aircraft type, airspeed, etc.

The direction of the aircraft 100 is indicated by on-board systems, including a heading indicator and a satellite navigation system. The control system 126 interfaces with these systems and uses the output of these systems to measure how the direction of the aircraft 100 has changed over the predetermined period of time. In some embodiments, the control system 126 measures the change in heading (θ). In some embodiments, the control system 126 measures the magnitude of deviation (D) from a straight flightpath as indicated by the track of the aircraft on a GPS system.

Using these measurements, the control system 126 then determines how efficiently the second HLFC apparatus 120 was working. The control system 126 comprises a function which relates the direction change measurements (e.g. heading change or distance from straight flight path) to a value of efficiency. The control system 126 uses the function to obtain an indication of the efficiency of the second HLFC apparatus 120.

In alternative embodiments, the efficiency of the second HLFC apparatus 120 may be determined on the basis of a comparison of the measured direction change with an expected direction change when the HLFC apparatus 120 is operating at maximum efficiency. For example, the expected heading change over the predetermined time period may be 5 degrees when the second HLFC apparatus 120 is operating at maximum efficiency. If the measured heading change was 2.5 degrees, the control system 126 may determine that the second HLFC apparatus 120 was operating at approximately 50% efficiency.

In some embodiments, the control system 126 determines a rate of change of direction (e.g. the rate of change of heading and/or rate of change of distance from a straight flight path). The control system uses the rate of change to calculate a value of efficiency (e.g. using a function, lookup table, or comparison). In embodiments, the first HLFC apparatus 118 and the second HLFC apparatus 120 are differentially operated only for as long as is required to determine the rate of change of direction with a sufficient degree of certainty.

The control system 126 then reactivates the second HLFC apparatus 120, and the control surfaces are used to bring the aircraft 100 back to the desired course. It is assumed that both the first HLFC apparatus 118 and the second HLFC apparatus 120 are operating at a comparable efficiency. If the efficiency is below a threshold value, then the operator of the aircraft 100 is alerted that cleaning or maintenance of the LFC system is required. The control system 126 can also update the predicted range of the aircraft 100 in dependence on the efficiency so measured.

In alternative embodiments, the control unit 126 performs a subsequent test in which the first HLFC apparatus 118 is deactivated while the second HLFC apparatus 118 is active and running at a power that maximizes the amount of drag reduction (minimizes drag).

Figure 5:
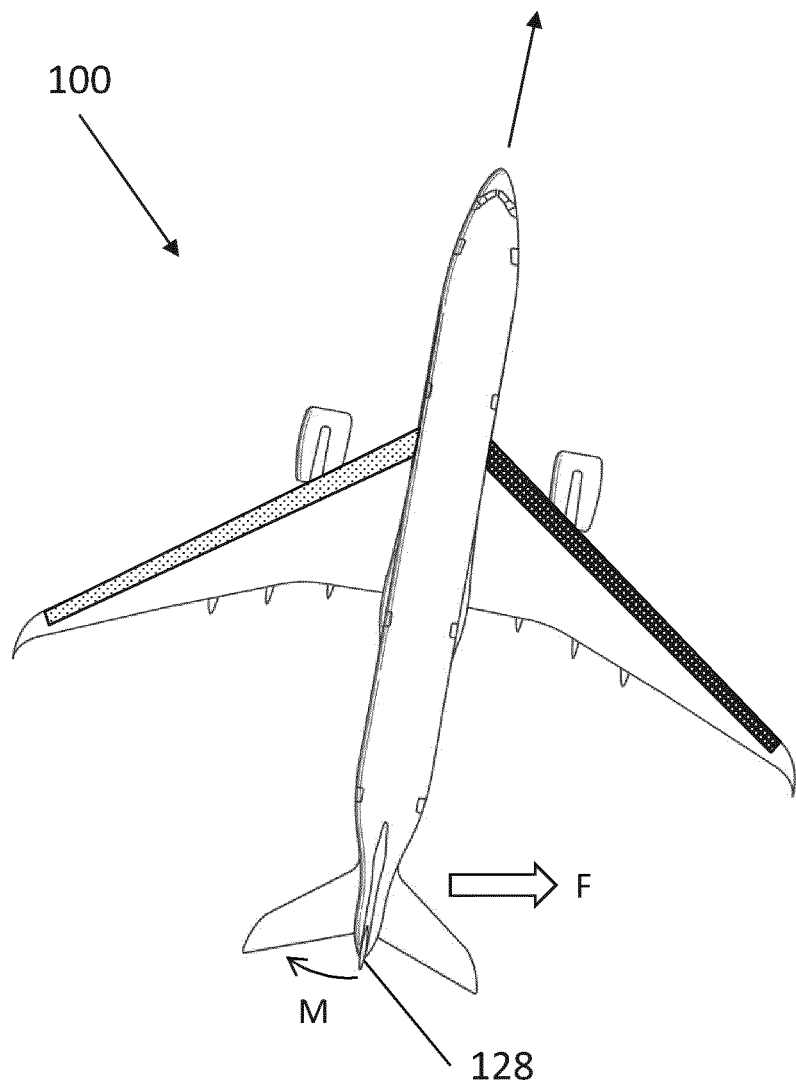
FIG. 5 shows a plan view of the aircraft according to the first embodiment of the disclosure herein, demonstrating a second method of testing the LFC system.

A second method of testing the LFC system will now be described with reference to FIG. 5. The second method begins in the same way as the first method: the control system 126 determines whether the flight conditions are suitable for the test to be initiated, and the control system 126 differentially operates the first HLFC apparatus 118 and the second HLFC apparatus 120 by deactivating the second HLFC apparatus 120. As soon as a change in direction of the aircraft 100 is sensed, the control system 126 instructs a corrective action in the form of a corrective movement (M) of the rudder 128 in order to create a corrective force (F) to counteract the imbalance in drag forces on the wings 104, 106 and bring the aircraft 100 back to the direction of flight prior to initiation of the test.

The control system 126 measures the amount of rudder 128 movement required to maintain the direction of flight. The amount of rudder movement is related to the efficiency at which the second HLFC apparatus 120 was operating. In a similar way to the first method, the control system 126 uses a function (or in alternative embodiments a lookup table or comparison) to determine how efficiently the second HLFC apparatus 120 was operating on the basis of the amount of rudder movement required. After the efficiency is calculated, the second HLFC apparatus 120 is reactivated and the rudder is returned to a neutral position.

Figure 6:
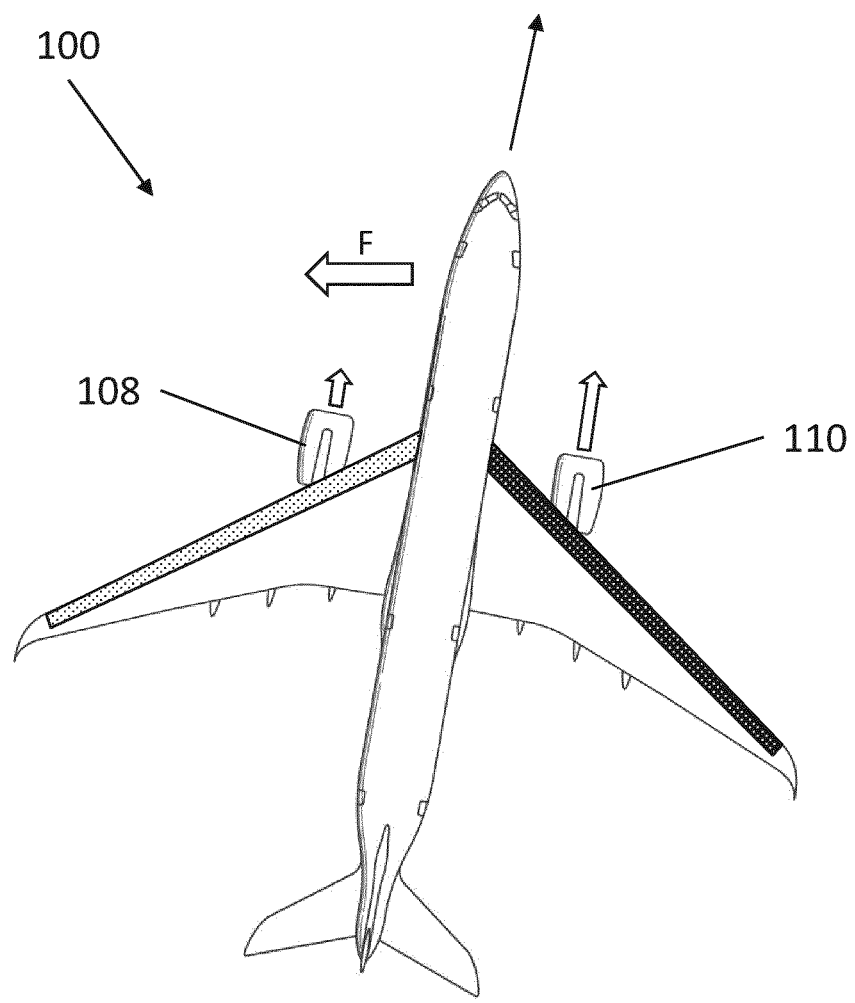
FIG. 6 shows a plan view of the aircraft according to the first embodiment of the disclosure herein, demonstrating a third method of testing the LFC system.

A third method of testing the LFC system will now be described with reference to FIG. 6. The third method is similar to the second method, however, the corrective action is an increase in thrust produced by the starboard engine 110. The control system 126 measures the extra amount of throttle required for the starboard engine 110 in order to bring the aircraft 100 back to the direction of flight prior to initiation of the test. The control system 126 then uses a function (or in alternative embodiments a lookup table or comparison) to determine how efficiently the second HLFC apparatus 120 was operating on the basis of the extra amount of throttle required. After the efficiency is calculated, the second HLFC apparatus 120 is turned back on and the starboard engine is throttled back to its initial level of thrust. In alternative embodiments, the corrective action could be a reduction in the trust produced by the port engine 108.

In addition to testing the efficiency of the LFC system, the control unit 126 is also configured to cause an intentional change of direction of the aircraft 100 in response to a command from the autopilot system, or operator, of the aircraft 100. The change of direction is effected by deactivating the HLFC apparatus 118, 120 on the side of the aircraft 100 that corresponds to the direction in which the aircraft 100 is to turn. Once the required change of direction is achieved, as determined by on-board systems including the heading indicator, the deactivated HLFC apparatus 118, 120 is reactivated.

During a change of direction, the rate of change of direction may be measured. The rate of change of direction measurement can, as per the first method described above, be used to provide an indication of the efficiency of the LFC system.

In the above described methods, differential operation of the first HLFC apparatus 118 and second HLFC apparatus 120 has been achieved by deactivating one of the HLFC apparatuses 118, 120, while the other remains active. In alternative methods, the differential operation is achieved by changing the rate of airflow in the first HLFC apparatus 118 relative to the second HLFC apparatus 120, without fully deactivating either HLFC apparatus 118, 120.

The control unit 126 is also configured to trim the aircraft 100. Trimming is achieved by changing the rate of airflow in the first HLFC apparatus 118 relative to the rate of airflow in the second HLFC apparatus 120, which thereby changes the drag caused by the port side of the aircraft 100 relative to the drag caused by the starboard side.

In embodiments, the control system 126 is configured to automatically detect the aircraft 100 is out of trim and automatically operate the HLFC apparatuses 118, 120 to improve trim. In embodiments, the control system 126 determines the aircraft is out of trim by detecting that flight control surfaces, such as the rudder, are required to be positioned away from a neutral position in order to maintain a straight course, or by detecting that the aircraft 100 consistently departs from a straight course despite such flight control surfaces being in a neutral position.

Figure 7:
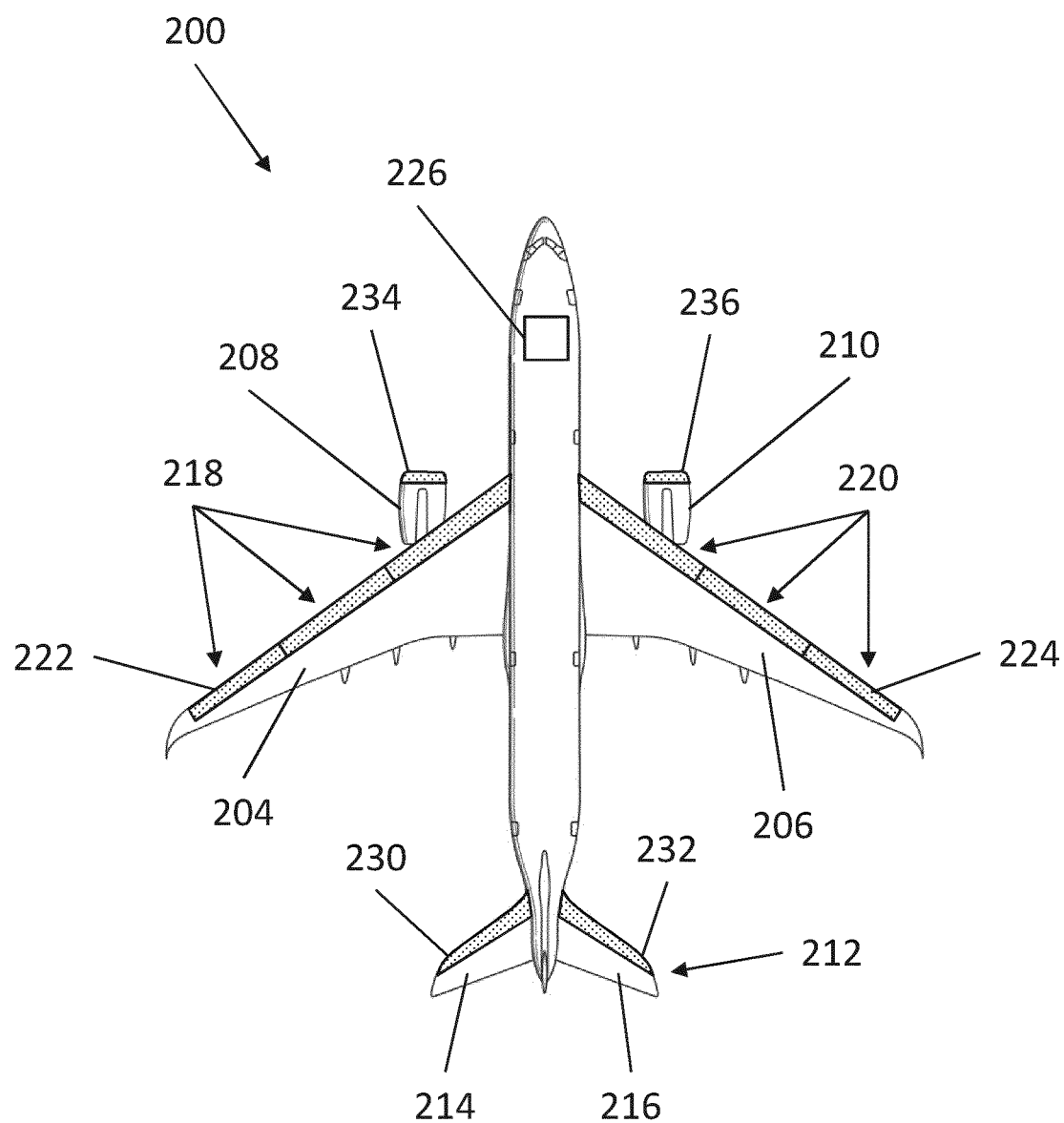
FIG. 7 shows a plan view of an aircraft according to a second embodiment of the disclosure herein.

FIG. 7 shows an aircraft 200 according to a second embodiment of the disclosure herein. The aircraft 200 comprises a port wing 204 and a starboard wing 206. The port wing 204 comprises three independently operable HLFC apparatuses 218. The starboard wing 206 comprises three corresponding independently operable HLFC apparatuses 220. Each HLFC apparatus is associated with a different section of a perforated leading edge 222, 224 of the respective wing 204, 206. The sections are distributed along the length of each wing 204, 206 in the spanwise direction.

The aircraft 200 further comprises an independently operable HLFC apparatus associated with a perforated leading edge region 230 of the port section 214 of the tailplane 212, and an independently operable HLFC apparatus associated with a perforated leading edge region 232 of the starboard section 216 of the tailplane 212. The port engine 208 nacelle and the starboard engine 210 nacelle also comprise perforated surfaces 234, 236. An independently operable LFC apparatus is associated with the perforated surface of each engine nacelle.

A control system 226 is configured to independently control each HLFC/LFC apparatus. The control system 226 is configured to test each corresponding pair of HLFC/LFC apparatuses in turn in order to determine their efficiency. For example, each HLFC apparatus 218 associated with a section of the port wing 204 may be deactivated in turn, followed by the HLFC apparatus associated with the port section 214 of the tailplane 212, and the LFC apparatus associated with the port engine 208 nacelle. During each deactivation, the effect on the heading of the aircraft is measured and the efficiency of the HLFC/LFC apparatus is obtained.

The control unit 226 may cause a change of direction of the aircraft 200, as per the first embodiment, by deactivating all or some of the HLFC/LFC apparatuses on one side of the aircraft 200.

Figure 8:
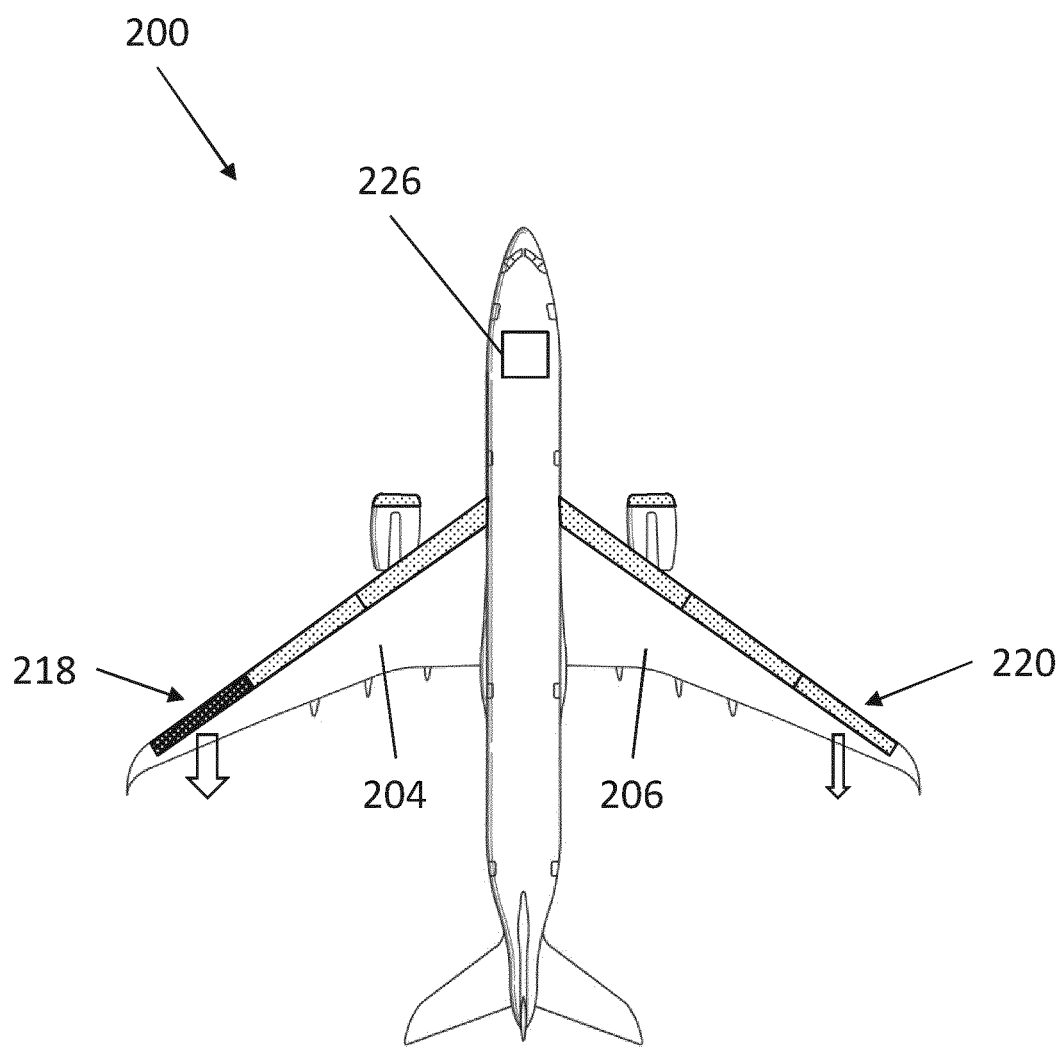
FIG. 8 shows a plan view of the aircraft according to the second embodiment of the disclosure herein, demonstrating a method of trimming the aircraft.

As shown in FIG. 8, the control system 226 is also configured to trim the aircraft 200. The trim may be achieved by differentially operating a first HLFC apparatus 218 associated with the perforated section located at a distal end (i.e. outboard-most end) of the port wing 204, and a second HLFC apparatus 220 associated with the perforated section located at a distal end (i.e. outboard-most end) of the starboard wing 206. The differential operation of these HLFC apparatuses is used to counteract an existing imbalance in the forces acting on the aircraft 200 which is causing the aircraft to be out of trim around the yaw axis. In embodiments, further corresponding pairs of HLFC/LFC apparatus may also be differentially operated in order to achieve trim of the aircraft 200.

In embodiments, the control system 226 may differentially operate the corresponding HLFC/LFC apparatuses by changing the relative rates of airflow therethrough, without fully deactivating either HLFC/LFC apparatus.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

In embodiments, the aircraft comprises alternative or additional active drag control systems which are differentially operable as between the port and starboard sides of the aircraft. In such embodiments, the control unit is configured to operate the active drag control system in order to determine the efficiency of the system, control the direction of the aircraft, and trim the aircraft.

It will be appreciated that the rate of airflow in an HLFC/LFC apparatus may be reduced to negligible amounts, such that the effect is the same as deactivating the HLFC/LFC apparatus. Where the context allows, references to deactivating, or turning off, an HLFC/LFC apparatus encompasses reducing the airflow to an amount in which the drag reduction effect is negligible.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

At least some or all of the subject matter disclosed herein can be implemented in or with software in combination with hardware and/or firmware. For example, the subject matter described herein can be implemented in software executed by a processor or processing unit. In an example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A laminar flow control (LFC) system for an aircraft, the LFC system comprising:
    a first LFC apparatus for use in a port aircraft structure, wherein the first LFC apparatus is operable to promote laminar flow of air over the port aircraft structure and thereby cause a reduction in drag on a port side of the aircraft;
    a second LFC apparatus for use in a starboard aircraft structure, wherein the second LFC apparatus is operable to promote laminar flow of air over the starboard aircraft structure and thereby cause a reduction in drag on a starboard side of the aircraft; and
    a control system configured to perform a test of the LFC system while the aircraft is flying a first direction by:
    differentially operating the first LFC apparatus and the second LFC apparatus to change an amount of drag on the port side of the aircraft caused by the port aircraft structure relative to an amount of drag on the starboard side of the aircraft caused by the starboard aircraft structure;
    measuring an effect of differentially operating the first LFC apparatus and the second LFC apparatus on the direction of flight of the aircraft; and
    determining, based on the measurement, how efficiently the first LFC apparatus and/or the second LFC apparatus is or are operating.

2. The LFC system according to claim 1, wherein the control system is configured to measure the effect of differentially operating the first LFC apparatus and the second LFC apparatus by measuring a change of direction of the aircraft.

3. The LFC system according to claim 1, wherein the LFC system comprises a plurality of independently operable first LFC apparatuses for use on the port side of the aircraft, and a corresponding plurality of independently operable second LFC apparatuses for use on the starboard side of the aircraft;
    wherein each first LFC apparatus and its corresponding second LFC apparatus define a pair of corresponding LFC apparatuses;
    wherein the control system is configured to differentially operate each pair of corresponding LFC apparatuses in turn to determine how efficiently each first LFC apparatus and each second LFC apparatus are operating.

4. The LFC system according to claim 1, wherein the control system is configured to initiate the test autonomously at predetermined times during flight.

5. The LFC system according to claim 1, wherein the control system is configured to determine a range of the aircraft in dependence on the efficiency of operation of the LFC system.

6. A control system for an LFC system according to claim 1.

7. The LFC system according to claim 1, wherein the control system is configured to measure the effect of differentially operating the first LFC apparatus and the second LFC apparatus by measuring an amount of corrective action required to restore a direction of flight to the first direction, and/or maintain a direction of flight in the first direction.

8. The LFC system according to claim 7, wherein the corrective action comprises changing a position of a control surface of the aircraft.

9. The LFC system according to claim 7, wherein the corrective action comprises changing a thrust provided by an engine of the aircraft.

10. An aircraft comprising an LFC system according to claim 1.

11. The aircraft according to claim 10, wherein the aircraft is an Unmanned Aerial Vehicle.

12. A laminar flow control (LFC) system for an aircraft, the LFC system comprising:
    a first LFC apparatus for use in a port aircraft structure, wherein the first LFC apparatus is operable to promote laminar flow of air over the port aircraft structure and thereby cause a reduction in drag on a port side of the aircraft;
    a second LFC apparatus for use in a starboard aircraft structure, wherein the starboard LFC apparatus is operable to promote laminar flow of air over the starboard aircraft structure and thereby cause a reduction in drag on a starboard side of the aircraft; and
    a control system configured to control a direction of the aircraft during flight by differentially operating the first LFC apparatus and the second LFC apparatus to change an amount of drag on the port side of the aircraft caused by the port aircraft structure relative to an amount of drag on the starboard side of the aircraft caused by the starboard aircraft structure;
    wherein the control system is configured to perform a test of the LFC system during a change of direction, the test of the LFC including the control system being configured to:
    measure a rate of change of the direction of the aircraft; and determine, based on the measurement, how efficiently the first LFC apparatus or the second LFC apparatus is operating.

13. An LFC system according to claim 12, wherein the control system is configured to initiate a change of direction in response to commands from an autopilot system of the aircraft.

14. An LFC system according to claim 12, wherein the control system is configured to cause a change of direction without movement of a rudder and/or without movement of an aileron of the aircraft.

15. A laminar flow control (LFC) system for an aircraft, the LFC system comprising:
 a first LFC apparatus for use in a port aircraft structure, wherein the first LFC apparatus is operable to promote laminar flow of air over the port aircraft structure and thereby cause a reduction in drag on a port side of the aircraft;
 a second LFC apparatus for use in a starboard aircraft structure, wherein the starboard LFC apparatus is operable to promote laminar flow of air over the starboard aircraft structure and thereby cause a reduction in drag on a starboard side of the aircraft; and
 a control system configured to trim the aircraft during flight by differentially operating the first LFC apparatus and the second LFC apparatus to change an amount of drag on the port side of the aircraft caused by the port aircraft structure relative to an amount of drag on the starboard side of the aircraft caused by the starboard aircraft structure;
 wherein the control system is configured to perform a test of the LFC system during a change of direction, the test of the LFC including the control system being configured to:
  measure a rate of change of the direction of the aircraft; and
  determine, based on the measurement, how efficiently the first LFC apparatus or the second LFC apparatus is operating.

16. The LFC system according to claim 15, wherein the LFC system comprises a plurality of independently operable first LFC apparatuses for use in a port wing of the aircraft, at least one of the first LFC apparatuses being located at a distal end of the port wing, and a corresponding plurality of independently operable second LFC apparatuses for use in a starboard wing of the aircraft, at least one of the second LFC apparatuses being located at a distal end of the starboard wing; and
 wherein the control system is configured to trim the aircraft by differentially operating the at least one first LFC apparatus at the distal end of the port wing that is configured to reduce drag caused by the distal end of the port wing and the corresponding at least one second LFC apparatus at the distal end of the starboard wing that is configured to reduce drag caused by the distal end of the starboard wing.

17. The LFC system according to claim 15, wherein the control system is configured to differentially operate the first LFC apparatus and the second LFC apparatus by changing a rate of airflow in the first LFC apparatus and/or the second LFC apparatus.

18. The LFC system according to claim 15, wherein the control system is configured to differentially operate the first LFC apparatus and the second LFC apparatus by deactivating either the first LFC apparatus or the second LFC apparatus.

19. The LFC system according to claim 15, wherein the port aircraft structure and the starboard aircraft structure are each a wing, a portion of a tailplane, or an engine nacelle.

20. The LFC system according to claim 15, wherein the LFC system is a Hybrid Laminar Flow Control (HLFC) system.

21. A method of testing a laminar flow control (LFC) system of an aircraft, wherein the aircraft comprises:
 a port aircraft structure comprising a first LFC apparatus operable to promote laminar flow of air over the port aircraft structure and thereby cause a reduction in drag on a port side of the aircraft; and
 a starboard aircraft structure comprising a second LFC apparatus operable to promote laminar flow of air over the starboard aircraft structure and thereby cause a reduction in drag on a starboard side of the aircraft; and
 the method comprising:
  flying the aircraft in a first direction;
  differentially operating the first LFC apparatus and the second LFC apparatus to change an amount of drag on the port side of the aircraft caused by the port aircraft structure relative to an amount of drag on the starboard side of the aircraft caused by the starboard aircraft structure;
  measuring an effect of differentially operating the first LFC apparatus and the second LFC apparatus on the direction of flight of the aircraft; and
  determining, based on the measurement, how efficiently the first LFC apparatus and/or the second LFC apparatus is or are operating.

22. A method of controlling a direction of an aircraft in flight, the aircraft comprising:
 a port aircraft structure comprising a first LFC apparatus operable to promote laminar flow of air over the port aircraft structure and thereby cause a reduction in drag on a port side of the aircraft; and
 a starboard aircraft structure comprising a second LFC apparatus operable to promote laminar flow of air over the starboard aircraft structure and thereby cause a reduction in drag on a starboard side of the aircraft;
 the method comprising:
  flying the aircraft in a first direction;
  differentially operating the first LFC apparatus and the second LFC apparatus to change an amount of drag on the port side of the aircraft caused by the port aircraft structure relative to an amount of drag on the starboard side of the aircraft caused by the starboard aircraft structure;
  differentially operating the first LFC apparatus and the second LFC apparatus such that the aircraft rotates about a yaw axis and the direction of flight changes; and
  during a change in the direction of flight:
   measuring a rate of change of the direction of the aircraft; and
   determining, based on the measurement, how efficiently the first LFC apparatus or the second LFC apparatus is operating.

23. A method of trimming an aircraft in flight, the aircraft comprising:
 a port aircraft structure comprising a first LFC apparatus operable to promote laminar flow of air over the port aircraft structure and thereby cause a reduction in drag on a port side of the aircraft; and
 a starboard aircraft structure comprising a second LFC apparatus operable to promote laminar flow of air over the starboard aircraft structure and thereby cause a reduction in drag on a starboard side of the aircraft;

the method comprising:
- flying the aircraft in a first direction, wherein the aircraft is out of trim such that there is rotation about a yaw axis;
- differentially operating the first LFC apparatus and the second LFC apparatus to change an amount of drag on the port side of the aircraft caused by the port aircraft structure compared to an amount of drag on the starboard side of the aircraft caused by the starboard aircraft structure such that the aircraft becomes trimmed about the yaw axis; and
- during a change in the direction of flight:
  - measuring a rate of change of the direction of the aircraft; and
  - determining, based on the measurement, how efficiently the first LFC apparatus or the second LFC apparatus is operating.

* * * * *